United States Patent
Perkins et al.

(10) Patent No.: US 7,064,660 B2
(45) Date of Patent: Jun. 20, 2006

(54) SYSTEM AND METHOD FOR INFERRING AN ELECTRONIC RENDERING OF AN ENVIRONMENT

(75) Inventors: Matthew R. Perkins, Sunrise, FL (US); Robert J. O'Dea, Fort Lauderdale, FL (US); Mark J. Johnson, Cary, IL (US); Neal K. Patwari, Ann Arbor, MI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/145,253

(22) Filed: May 14, 2002

(65) Prior Publication Data

US 2003/0214397 A1    Nov. 20, 2003

(51) Int. Cl.
*G08B 1/08* (2006.01)

(52) U.S. Cl. .......................... 340/539.13; 340/286.05; 340/524; 340/577; 340/628; 340/632; 73/23.2; 702/23

(58) Field of Classification Search ............... 340/524, 340/286.05, 577, 628, 632, 539.13, 627, 340/6; 702/23; 73/31.02, 53.01, 23.2
See application file for complete search history.

(56) References Cited

U.S. PATENT DOCUMENTS

| | | | |
|---|---|---|---|
| 4,468,656 A | 8/1984 | Clifford et al. | |
| 4,709,330 A | 11/1987 | Yokoi et al. | |
| 4,978,946 A | 12/1990 | Nordholm et al. | |
| 5,016,007 A | 5/1991 | Iihoshi et al. | |
| 5,319,363 A | 6/1994 | Welch et al. | |
| 5,528,248 A | 6/1996 | Steiner et al. | |
| 5,646,629 A | 7/1997 | Loomis et al. | |
| 5,654,690 A * | 8/1997 | Ishikawa et al. | 340/506 |
| 5,774,824 A | 6/1998 | Streit et al. | |
| 5,793,882 A | 8/1998 | Piatek et al. | |
| 5,867,110 A | 2/1999 | Naito et al. | |
| 6,181,253 B1 | 1/2001 | Eschenbach et al. | |
| 6,182,497 B1 * | 2/2001 | Krajci | 73/23.2 |
| 6,317,029 B1 * | 11/2001 | Fleeter | 340/10.32 |
| 6,317,042 B1 * | 11/2001 | Engelhorn et al. | 340/539.1 |
| 6,323,780 B1 * | 11/2001 | Morris | 340/692 |
| 6,339,709 B1 | 1/2002 | Gladwin et al. | |
| 6,480,783 B1 | 11/2002 | Myr | |
| 6,487,496 B1 | 11/2002 | Katayama et al. | |
| 6,504,794 B1 | 1/2003 | Haase et al. | |
| 6,580,979 B1 | 6/2003 | Payton et al. | |
| 6,624,750 B1 * | 9/2003 | Marman et al. | 340/506 |
| 6,646,545 B1 | 11/2003 | Bligh | |
| 6,700,493 B1 * | 3/2004 | Robinson | 340/573.1 |
| 6,737,967 B1 * | 5/2004 | Farley | 340/514 |
| 6,772,071 B1 * | 8/2004 | Gilbert et al. | 702/23 |
| 6,809,642 B1 * | 10/2004 | Brenner | 340/506 |

* cited by examiner

*Primary Examiner*—Davetta W. Goins
(74) *Attorney, Agent, or Firm*—Terri S. Hughes; Valerie M. Davis

(57) ABSTRACT

A system and method for inferring an electronic rendering (170) of an environment (110) comprises a plurality of devices (341 and 345), and a processing device. Each wireless device is capable of determining a distance between a neighboring wireless device. Moreover, each device is capable of performing at least one of the following: determining an environmental attribute of the environment, and determining a location of an object in the environment. The processing device gathers information determined from the plurality of devices and infers the electronic rendering of the environment based on the information gathered.

19 Claims, 5 Drawing Sheets

SYSTEM AND METHOD FOR INFERRING AN ELECTRONIC RENDERING OF AN ENVIRONMENT

REFERENCE TO RELATED APPLICATION

The present application is related to U.S. application Ser. No. 10/145,257, filed May 14, 2002, titled "System and Method for Inferring a Set of Characteristics of an Environment with Location-Capable devices" by Johnson et al. commonly owned together with this application by Motorola, Inc.

FIELD OF THE INVENTION

The present invention relates generally to a system and method for inferring an electronic rendering of an environment.

BACKGROUND OF THE INVENTION

Location systems, well known in the art, have reached a level of sophistication where accurate location coverage in buildings and other confined areas is becoming practical. Spread-spectrum and ultra-wide-band ("UWB") technologies have offered dramatic improvements in timing accuracy, distributed systems have emerged to address coverage issues, and feasible implementations of portable inertial navigation systems ("PINS") are emerging that can address short-term stability and coverage holes.

Use cases for in-building location systems are generally envisioned in conjunction with a pre-installed infrastructure for the location system, as well as detailed building plans allowing location information to be correlated with the layout of the building or vicinity of the incident. However, there are a number of real-world cases where this information is unavailable. Firefighters, police, and military personnel, for example, are often required to operate in environments that are uncharacterized at first contact. Databases containing building floor plans are being built up in some urban areas, but floor plans can change frequently, and many incidents occur in older and abandoned structures for which this data is unavailable. Military operations on foreign soil will often require operation in environments for which such data are unknown or intentionally withheld by an adversary.

This issue particularly affects emergency operations, such as firefighting, since lack of power, dense smoke, and other conditions can reduce visibility to inches. Characterization of the development of an incident, identification of risks such as hazardous materials, prediction of flashover and backdraft conditions, rescue operations, and planning of escape routes are all requirements that would benefit greatly from knowledge of the topology and state of the vicinity of an incident. The a priori collection of topological information, such as floor plans, is often impractical; the a priori collection of situational information, such as blocked or impassable routes, structural damage, environmental temperatures, adversary presence, presence of hazardous materials or deployment of chemical or biological weapons, is by definition impossible.

Thus, there exists a need for a method of dynamically constructing an electronic rendering of a given area that will allow a user to determine their location relative to objects or other users in the given area, as well as characteristics/attributes of the given area.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the figures.

While the invention has applications in a number of areas, scenarios for fireground operations, and particularly fireground operations within buildings, are currently the best developed. As such, these scenarios are predominantly used herein by way of example. This is done for the sake of clarity and consistency, and is not intended to imply any corresponding limitation on the use of the present invention, which is equally applicable to numerous unrelated applications.

Figure 1:
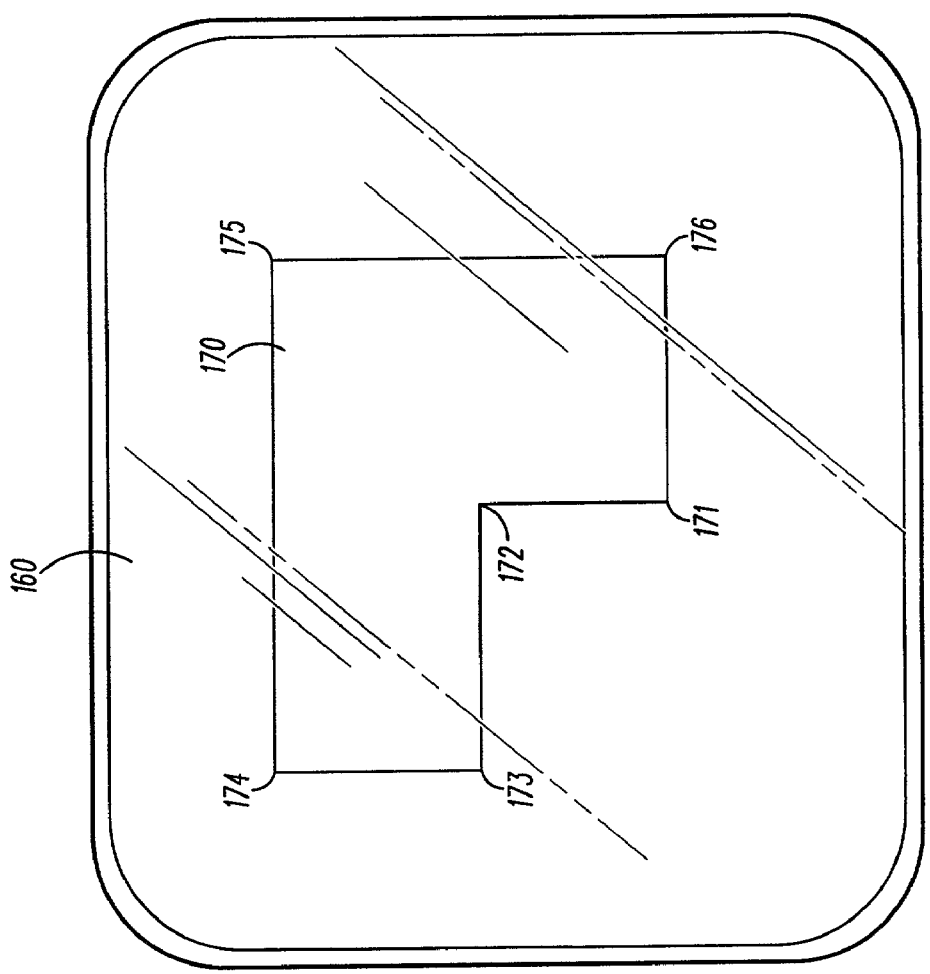
FIG. 1 is a schematic illustration of an office building that is undergoing an electronic rendering of its exterior in accordance with the present invention.
Figure 1:
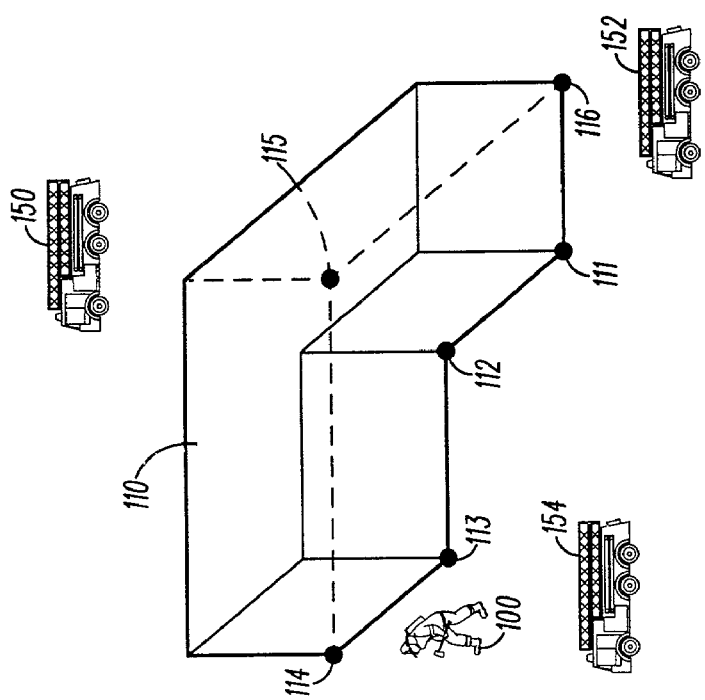

Referring now to FIG. 1, a method of providing a meaningful ground reference for an ad-hoc location system is illustrated. Reference sites 150, 152, 154 are deployed around a building 110. These reference sites 150, 152, 154 may comprise a part of the infrastructure of a location system, or may simply be used as a reference, for example to initialize velocity models of portable inertial navigation system devices. While this example shows three such reference sites, the number of reference sites required for location will vary according to the location system technology and architecture. In the prior art, the reference sites 150, 152, 154 would be ground-referenced (e.g., by determining their geocentric latitude and longitude), for example by using global positioning system location devices, and this ground reference would provide a reference to pre-existing ground-referenced maps of the buildings. However, in many cases, an accurate ground-referenced location or a ground-referenced map or floor plan of the building is unavailable.

It is typical in fireground situations for an incident commander ("IC") 100 or other personnel to inspect the exterior of the building 110 before mounting an interior attack. In FIG. 1, the IC 100 is assumed to be carrying a location device that provides a location relative to the reference sites 150, 152, 154. This may be accomplished using techniques known in the art, including but not limited to ranging, angle of arrival, time difference of arrival, received signal strength, inertial navigation, or combinations thereof. The device may be equipped with a manual control allowing the IC 100 to initiate or record a location estimate. By activating this control near the corners 111, 112, 113, 114, 115, 116 of the building 110 such that a centralized system records those locations, the IC 100 may enable the drawing on a display 160 of an outline 170 of the building 110 by connecting location estimates 171, 172, 173, 174, 175, 176 corresponding to the corners 111, 112, 113, 114, 115, 116. Since the location of the IC 100 is known relative to the reference sites 150, 152, 154, the outline 170 of the building 110 is also known relative to the reference sites 150, 152, 154 and may be used as a reference for any other location relative to the reference sites 150, 152, 154. Note that, according to the present invention, the characterization display of the locations of the reference sites 150, 152, 154 is not required; they simply provide a common reference for other locations.

Figure 2:
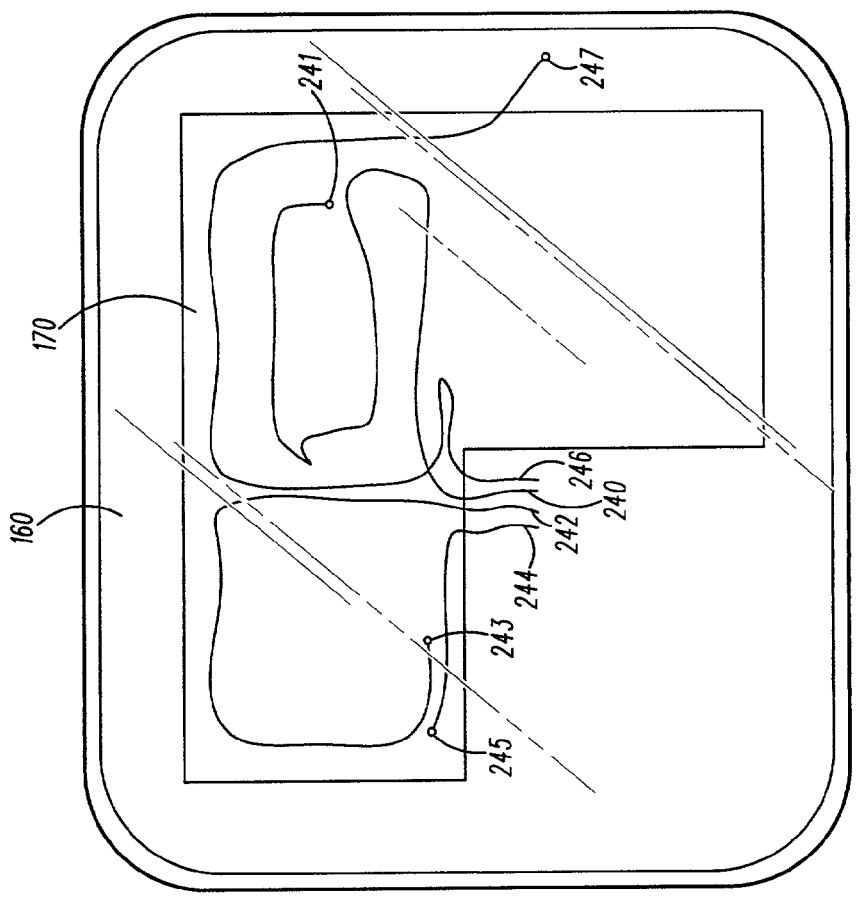
FIG. 2 is a schematic illustration of an office building that is being traversed by firefighters that are outfitted with wireless communication devices involved in compiling location information in order to produce a rendering of all routes traveled in accordance with the present invention.
Figure 2:
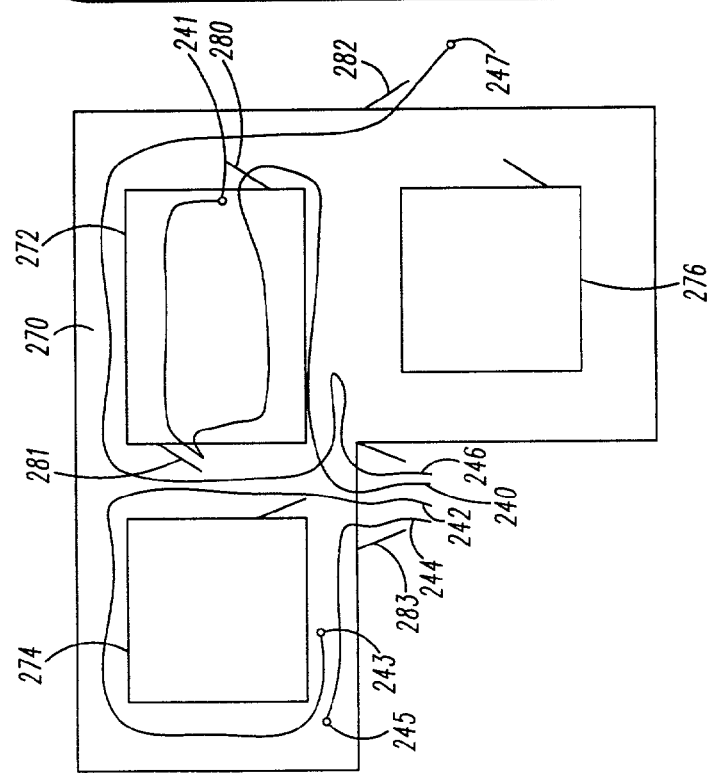

Referring now to FIG. 2, a more sophisticated mapping solution is illustrated. A first user enters the building (represented in the figure as a floor plan of the area 270) traveling along path 240, finding and entering room 272 through door 280, discovering door 281 on the opposite side, and finally arriving at location point 241. A second user enters the building traveling along path 242, traveling up and around room 274, and finally arriving at location point 243. A third user enters the building traveling along path 244 and immediately turns left, arriving at location point 245. A fourth user enters the building traveling along path 246 attempting to retrace path 240, but finds that the aisle is no longer passable; the fourth user, traveling along path 246, goes around room 272, finds door 282, and exits the building, arriving finally at location point 247.

Due to the low visibility, these users often become disoriented and unaware of their relative and absolute locations. The result is often failure to evacuate when structural danger, personal health, or low air supply demand it. The preferred embodiment of the present invention assumes that each user is equipped with location equipment similar to that described as being used by the IC 100. As such, their locations may be tracked on display 160, on which a building outline 170 may have been drawn as described previously. In the current location systems art, the IC 100 would note that the location point 243 of the affected user is near the main entrance 283 where all the paths 240, 242, 244, 246 begin; however neither the IC 100 or the second user at location point 243 can be assured that there exists a direct exit path from the location 243 to the main entrance 283.

In accordance with the present invention, the display 160 may optionally indicate not only the location points 241, 243, 245, 247 of the users, but the location history representing the paths 240, 242, 244, 246 of those users. Noting that path 244 leads directly from the main entrance 283 to a point very close to the location point 243 of the second user, the IC 100 may infer that a direct path exists between the location point 243 and the main entrance 283. While FIG. 2, for clarity's sake, attempts to minimize overlap between the paths, in a real-life scenario the paths would overlap routinely, giving the IC 100 a greater certainty that there is no obstacle between the point 243 and the shortest exit path 244.

This improvement is illustrated more dramatically on the right side of FIG. 2. In this scenario, the first user at location point 241 is the one requiring evacuation. In the current location systems art, the IC 100 would typically direct the first user at location point 241 to evacuate via door 283 without further help, as only the points 241, 243, 245, and 247 would be displayed. It would then be up to the first user to negotiate an exit route; if that user were not disoriented and remembered his entry path, an exit through door 280 and a reverse traversal of the entry path would seem the best option. However, the historical data of path 246 captured by the present invention indicates that that the fourth user (now at location point 247) attempted to use that passage at a later time and found it impassable; indicating in advance that an alternative exit route must be used. Noting the proximity of the path 246 to the path 240 near the door 280, the IC 100 may now not only direct the first user at location point 241 to an alternate path, but can clearly infer the existence of an alternate exit through the door 282 used by the fourth user currently at location point 247, representing an escape route even shorter than the affected user's entry route.

Although the above examples, for the sake of clarity, are oversimplified and assume that the IC 100 interprets the data manually, it will be clear to those skilled in the art that a realistic situation will offer far more data, and that the correlation of paths and the inference of obstacles may be automated to a great extent in software.

Figure 3:
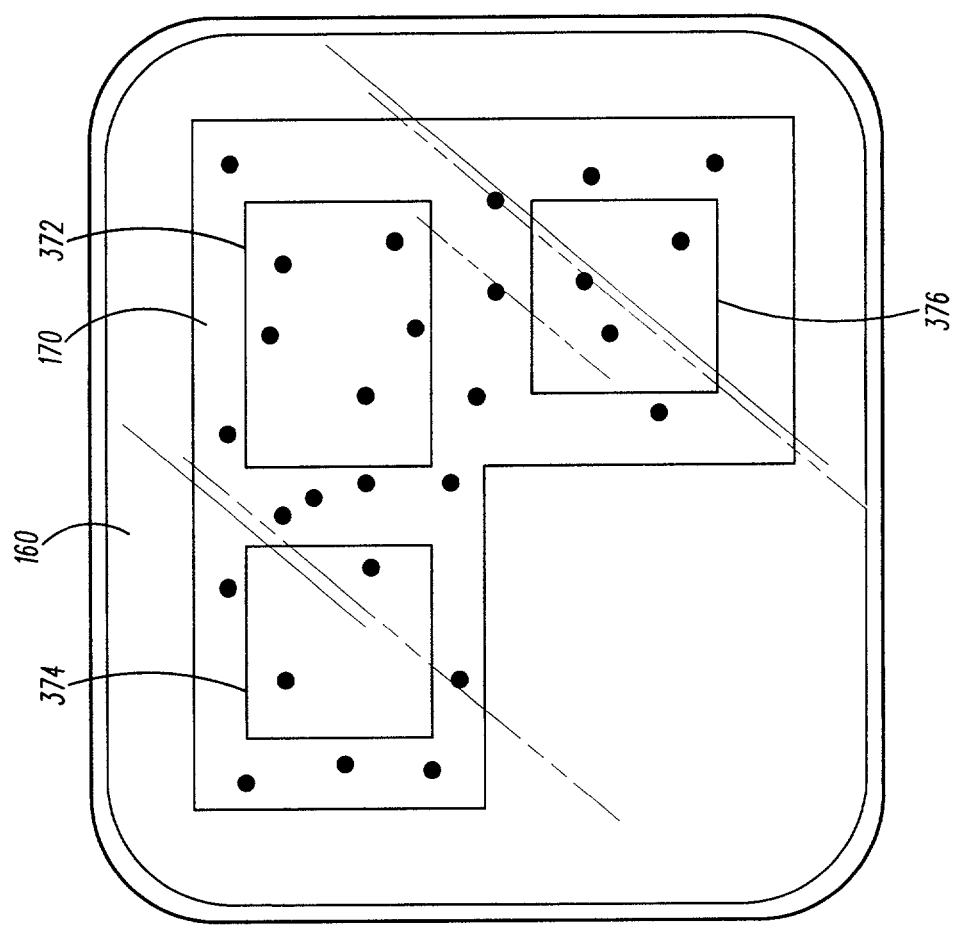
FIG. 3 is a floor plan of the interior of and office building, in which are located a number of wireless communication devices involved in determining the physical characteristics of the building in accordance with the present invention.
Figure 3:
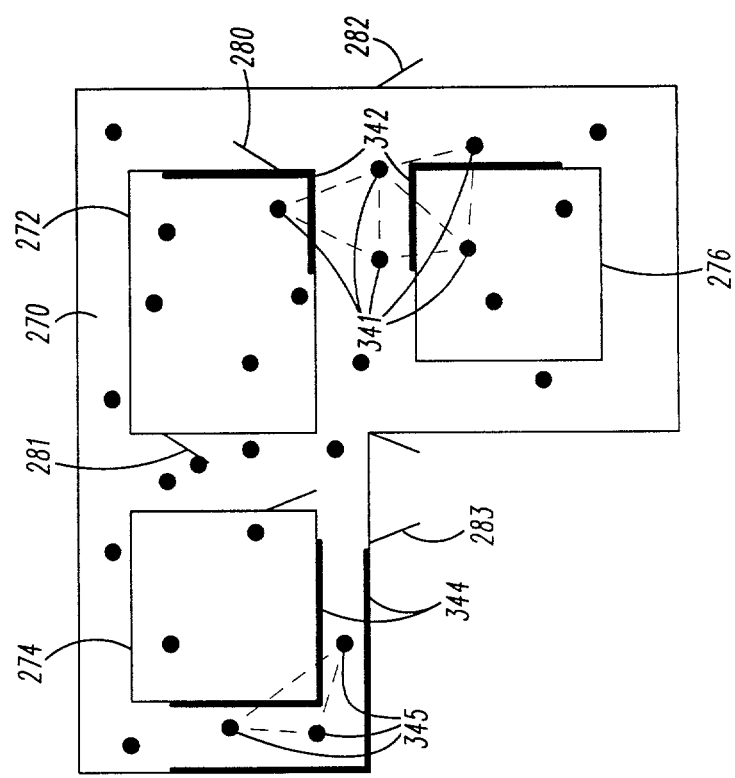

A further enhancement of the present invention is the integration of additional sensing capabilities beyond mere location. FIG. 3 illustrates the use of imaging devices, such as those described in U.S. Ser. No. 09/845,467, filed Apr. 20, 2001, titled "Intra-Piconet Location Determination and Tomography", by Callaway et al., commonly owned together with this application by Motorola, Inc., the disclosure of which prior application is hereby incorporated by reference, verbatim and with the same effect as though it were fully and completely set forth herein.

In the preferred embodiment, a large number of devices (represented as black dots in FIG. 3) are deployed. In addition to location awareness, these devices are capable of characterizing a propagation environment. Although a single device may theoretically characterize the local propagation environment by detecting images of its own signal, the preferred embodiment measures propagation characteristics between a transmitting device and a receiving device. The patent application having U.S. Ser. No. 09/845,467 referenced above describes how the two devices may estimate a range between themselves and generate a model of the detected obstructions relative to the devices based on their distance and the measured propagation effects; however, the present invention further enables the set of two or more devices involved in the propagation measurements to convey their results to a centralized or distributed model of the environment in terms of their location relative to reference devices. For example, it is seen that the group of devices 345 may characterize the darkened obstacles 344, which are segments of the walls of the room 274 and the outer walls of the building. Similarly, the group of devices 341 may characterize the darkened obstacles 342, which are segments of the walls of the rooms 272, 276. While this information may be of some use to the users of devices in those groups, the present invention allows for a large improvement in their value to other users by allowing the relative locations of the devices to be mapped to a common reference. It will be appreciated by those skilled in the art that with the tomographic results from the devices 345, 341, plus all the little devices that made this all possible, representations 372, 374, 376 of the rooms 272, 274, 276 may be constructed relative to the established building outline 170 and as such integrated into a coherent map of the environment as shown on display 160. This would serve to prevent collisions with obstacles in the vicinity.

It will be apparent to those skilled in the art that the function of the multiplicity of propagation detection devices described above may be fulfilled by either a single device detecting the reflected images of its own signal, or by at least two devices receiving the images of each others' signals, provided that the devices occupy a statistically significant number of locations in the target area during an interval of time over which the features of the target area do not change significantly.

Figure 4:
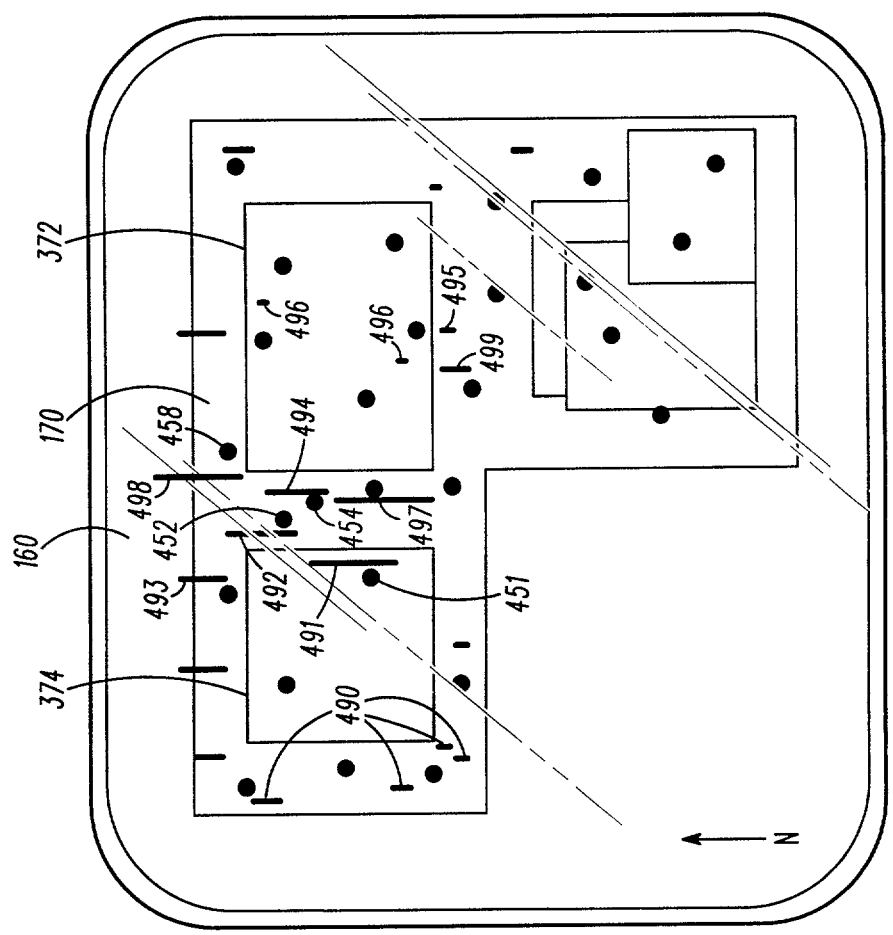
FIG. 4 is a floor plan of the interior of and office building, in which are located a number of wireless communication devices involved in determining the environmental characteristics of the building in accordance with the present invention.
Figure 4:
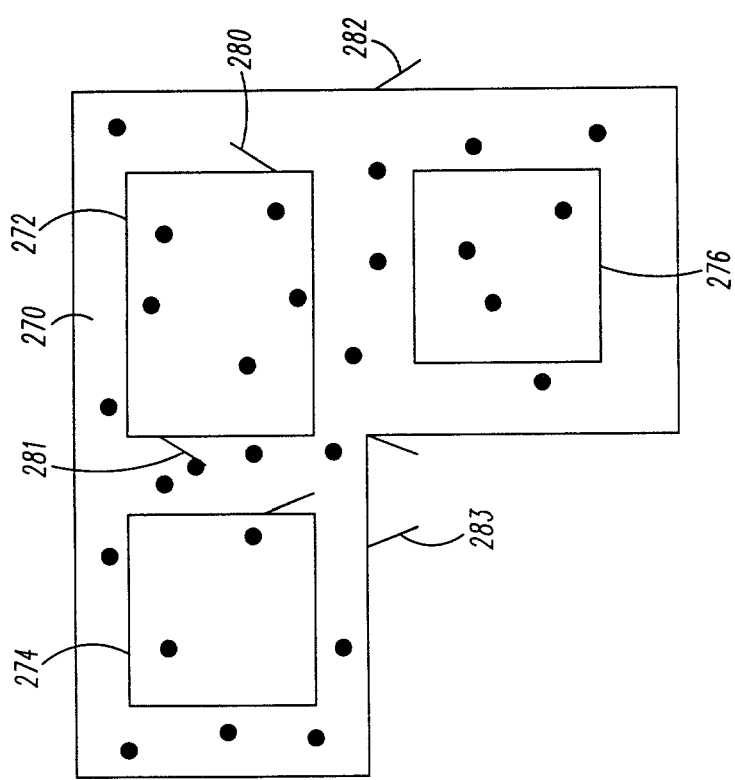

Referring now to FIG. 4, a further extension of the system is illustrated in which other environmental parameters are integrated into the system database. For the sake of simplicity, temperature is used as an example of a relevant environmental parameter due to its simplicity and ease of representation. FIG. 4 illustrates the same attack scenario described above, but with periodic temperature readings represented by bars such as those labeled in the 490 series. The temperature readings are associated with the locations of the sensors at the time the readings were taken, and may represent results from different sensors or from the same sensor at different times. Longer bars represent higher temperatures.

Along the northeast wall of the room 274, it can be seen that the readings corresponding to the location estimates 452, 454, 458 indicate higher temperature readings 492, 494, 498 than those from other devices in area 270 which would indicate that a heat source is located nearer to the northeast corner of room 274, represented by the rendering 374 on the display 160. Further support for this estimate comes from the temperature reading 491 from the device at location 451 that is located inside room 374 and displaying the highest temperatures of any sensing device in the area 270. It may be reasonably inferred based on the correlated location data and imaging data that the heat source is inside the room 274 near the northeast corner. Further, the temperature readings 497, 498, 499, that were obtained at a substantially later time than the temperature readings 492, 495 respectively, which were obtained in substantially the same locations but at a substantially earlier time. The difference between the earlier temperature readings 492, 495 and the later temperature readings 497, 498, 499 respectively may be used to infer the rate and direction of progress of the fire.

Although for clarity this example describes the present invention, and particularly the interpretation of the results in the form of a heuristic and manual process, it will be clear to those skilled in the art that any number of numeric and algorithmic techniques known in the art may be applied to partially or fully automate the interpretation without detracting from the present invention. Further, the measurements which may benefit from the location correlation techniques described herein are hardly limited to the imaging and temperature data described above, but may include such data as: detection of hazardous materials, explosives, volatiles, marker chemicals, or other chemical data; measurements of humidity, barometric pressure, levels of oxygen, carbon monoxide, carbon dioxide, radon, and other atmospheric data; levels of oxygen, carbon monoxide, carbon dioxide, radon, and other gases in the air; detection of specific materials (e.g., iron, metal, gunpowder, etc.); measurement of mechanical vibration, seismic disturbance, data from actively initiated sounding activities, and other motion; detection of extraneous vital signs indicating presence of a victim or adversary; detection or interpretation of electromagnetic and acoustic signals; readings of an associated user's vital signs and equipment status (e.g., to correlate remaining survivable time with known exit routes or to identify areas of stress-inducing environmental effects not detected by other equipment); and others far to numerous to mention herein.

Figure 5:
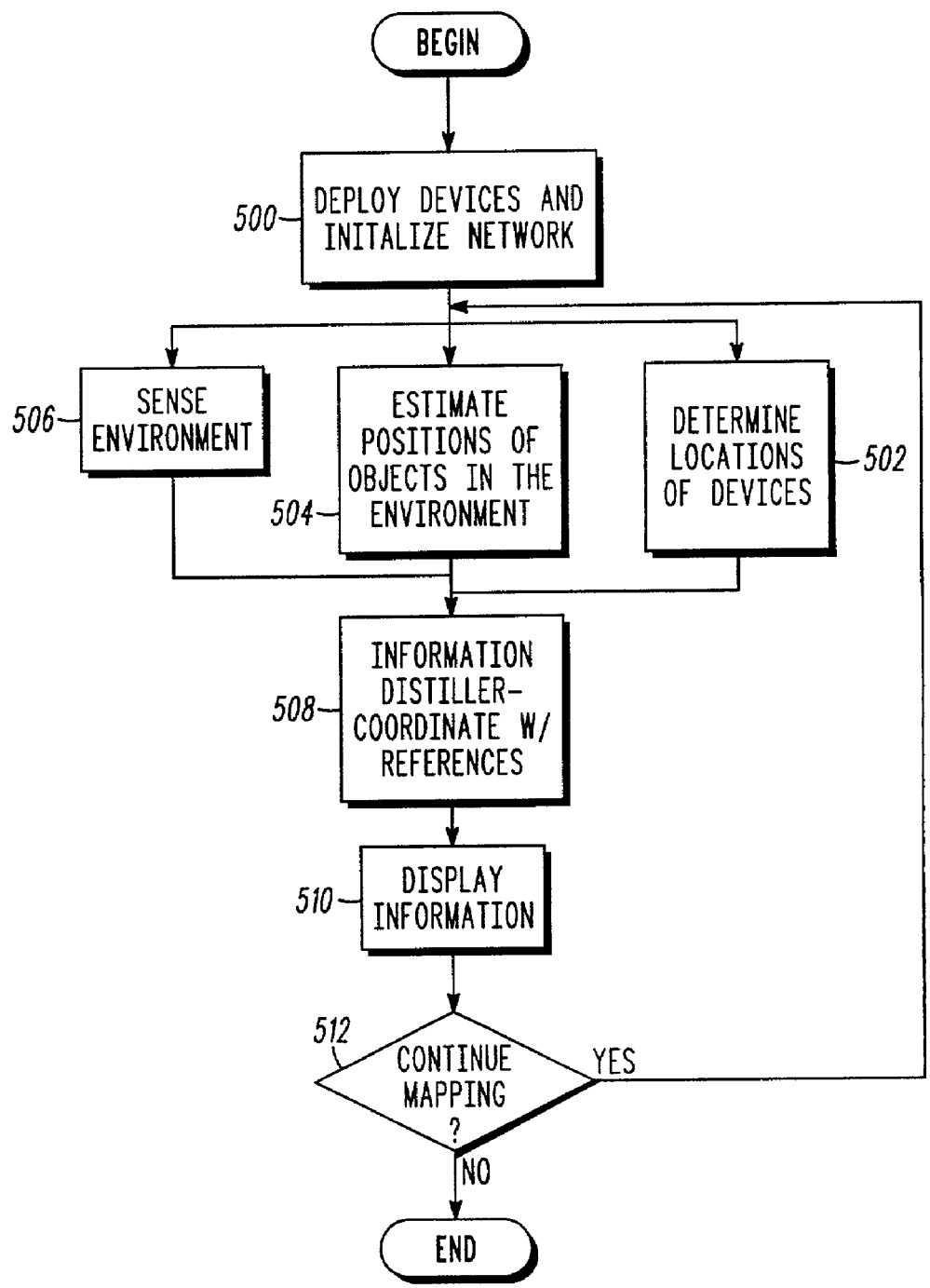
FIG. 5 is a flow diagram of an operation of the wireless system in accordance with the present invention.

Referring now to FIG. 5, a flowchart illustrates the operation of the present invention within a network established in step 500, the network including devices such as the location/sensing devices carried by the IC 100 and by the other users traveling the paths 240, 242, 244, 246 and any others deployed on the scene, as well as the unit associated with the display 160, a centralized database, and a central processing unit associated with that database. These functions may be distributed or combined on a single device.

In the preferred embodiment, once the wireless communication devices have determined 502 their locations relative to the reference sites 150, 152, 154, a set of environmental characteristics may be determined 504, for example the presence and/or location of objects or obstacles in the environment. Once objects are identified relative to the portable device, and the position of the portable device is known, a central processor creates a rendering (i.e., sketch, map, etc.) of the objects in the environment; since the transmitting and receiving device are known and the distance in which the object is reflecting signals, the position of the object can be estimated. For the sake of clarity, the rendering is described herein as a graphical display of the results; however, the actual rendering comprises the association of objects or environmental conditions in the environment with estimated locations of the objects or environmental conditions. The rendering may be expressed in a variety of forms, as long as it contains information about the environment that is associated with location estimates.

Similarly, the wireless devices determine a set of parameters of the environment in which they are deployed 506. Preferably, each wireless communication device is equipped with at least one sensor. The type of sensor used is dependent on the given application. For example, in the fire ground environment, the sensor may measure temperature, moisture, toxins, humidity, motion, or the like. Once the sensor gathers its data from the environment (e.g., location of the "hot" spots/danger area, or the like), it transmits the data directly or indirectly to a centralized database.

A central processing unit with access to the centralized database gathers the various types of information received from the plurality of devices (e.g., locations of the devices 502, characteristics of the environment 504, and attributes of the environment 506) 508. The central processing unit applies relative location/distance techniques and mapping algorithms, as known in the art, and creates a rendering 510 of the environment on the display 160 with the various types of information plotted on the rendering. Once the various types of information are combined, the rendering of the environment with the various types of information plotted on the display 160 which may comprise a monitor, heads-up display, personal digital assistant, or the like.

The central processing unit continues to gather the various types of information from the other devices and update the rendering of the environment accordingly 512 until the operation is terminated.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A system for inferring an electronic rendering of an environment comprising:
    a plurality of devices, whose locations are estimated, and wherein each device is capable of performing at least one of the following: determining an environmental parameter of the environment, and estimating a location of an object, other than the plurality of devices, in the environment; and
    a processing device, wherein the processing device gathers information determined from the plurality of devices, the information including the estimated location of at least one object in the environment, and infers the electronic rendering of the environment based on the information gathered.

2. The system of claim 1 wherein the locations of the plurality of devices are estimated by an external system.

3. The system of claim 1 wherein the locations of the plurality of devices are estimated by the plurality of devices.

4. The system of claim 1 wherein the processing device infers a set of characteristics about the environment based on the information gathered from the plurality of devices.

5. The system of claim 1 wherein the processing device displays the electronic rendering on at least one of the following displays: a heads-up display, a monitor, a personal digital assistant, and a hand-held device.

6. The system of claim 5 wherein the display is dependent on the processing device.

7. The system of claim 5 wherein the display is independent from the processing device.

8. The system of claim 1 wherein the environmental parameter of the environment is based on at least one of the following: temperature, moisture, gas, fire, hydrocarbon, humidity, viruses, and motion.

9. The system of claim 1 wherein the location of the object in the environment is estimated by measuring propagation effects of the environment.

10. The system of claim 1 wherein at least some of the plurality of devices establish a communication link with the processing device.

11. The system of claim 1 wherein at least two of the plurality of devices form at least one network.

12. The system of claim 1 wherein the processing device knows the location of at least one device a priori.

13. The system of claim 1 wherein at least a subset of the plurality of devices is deployed into the environment via one of the following techniques: shooting the devices into the environment with a projectile device, sprinkling the devices into the environment with a hose, dropping the devices into the environment as the given area is traversed, and dropping the devices into the environment from overhead.

14. The system of claim 13 wherein the processing device does not have information about the environment prior to deployment of any of the plurality of devices.

15. The system of claim 1 wherein each device periodically determines the distance between itself and at least one neighboring device, and periodically determines at least one of the following: the environmental parameter of the environment, and the estimated location of an object in the environment.

16. The system of claim 15 wherein the processing device periodically gathers new information determined from the plurality of devices and infers additional characteristics of the environment based on the new information gathered.

17. A method for inferring an electronic rendering of an environment comprising the steps of:
    deploying a plurality of devices into the environment, wherein at least some of the devices are capable of determining a distance to a neighboring device, and wherein each device is capable of performing at least one of the following functions: detennining an environmental parameter of the environment, and estimating a location of an object, other than the plurality of devices, in the environment; and
    inferring the electronic rendering of the environment based on at least one estimated location of an object in the environment.

18. The method of claim 17 further comprising the step of inferring a set of characteristics of the environment based on at least one of the following: at least one environmental parameter of the environment, and at least one estimated location of an object in the environment.

19. The method of claim 17, wherein the electronic rendering of the environment is inferred based on at least one environmental parameter of the environment.

* * * * *